United States Patent [19]

Burkett

[11] Patent Number: 4,877,531

[45] Date of Patent: Oct. 31, 1989

[54] PROCESS FOR TREATING VARIOUS REFUSE MATERIALS, PARTICULARLY SMOKE, GARBAGE AND SEWAGE

[76] Inventor: Albert L. Burkett, 3984 N. Roger La., Tucson, Ariz. 85719

[21] Appl. No.: 268,199

[22] Filed: Nov. 7, 1988

[51] Int. Cl.⁴ .................... B01D 53/34; C02F 3/02
[52] U.S. Cl. .................... 210/620; 210/767; 210/173; 210/916; 241/21; 241/DIG. 38; 261/2; 261/5; 71/12; 71/13; 71/14; 71/901
[58] Field of Search .................... 241/18, 21, 24, 62, 241/DIG. 38; 210/620, 767, 173, 916; 261/2, 5; 71/12, 13, 14, 901

[56] References Cited

U.S. PATENT DOCUMENTS

| 829,954 | 9/1906 | Edson | 71/14 |
|---|---|---|---|
| 1,408,064 | 2/1922 | Balmer | 71/14 |
| 2,023,247 | 12/1935 | Senseman | 241/18 |
| 3,160,354 | 12/1964 | Burkett | 241/275 |
| 3,212,233 | 10/1965 | Hubby | 55/85 |
| 3,635,409 | 1/1972 | Brewer | 241/DIG. 38 |
| 3,828,525 | 8/1974 | Copa et al. | 210/916 |
| 3,985,086 | 10/1976 | DeToln | 241/23 |
| 3,987,970 | 10/1976 | Burkett | 241/154 |
| 4,144,167 | 3/1979 | Burkett et al. | 210/416.1 |
| 4,151,794 | 5/1979 | Burkett | 241/154 |
| 4,157,961 | 6/1979 | Borst | 210/768 |
| 4,162,971 | 7/1979 | Zlokarnik et al. | 210/620 |
| 4,253,940 | 3/1981 | Price | 241/23 |
| 4,493,459 | 1/1985 | Burkett | 241/154 |
| 4,586,659 | 5/1986 | Easter, II | 241/24 |

Primary Examiner—Peter Hruskoci
Assistant Examiner—Christopher Upton
Attorney, Agent, or Firm—Shlesinger & Myers

[57] ABSTRACT

A process for treating smoke, aqueous sewage and solid waste/refuse materials by digesting all three waste material into an odor-free pumpable slurry. The slurry is screened to separate solids from the aqueous solution. The odor-free solids may be used as fertilizers and the odor free solution may be used for irrigational purposes.

4 Claims, 1 Drawing Sheet

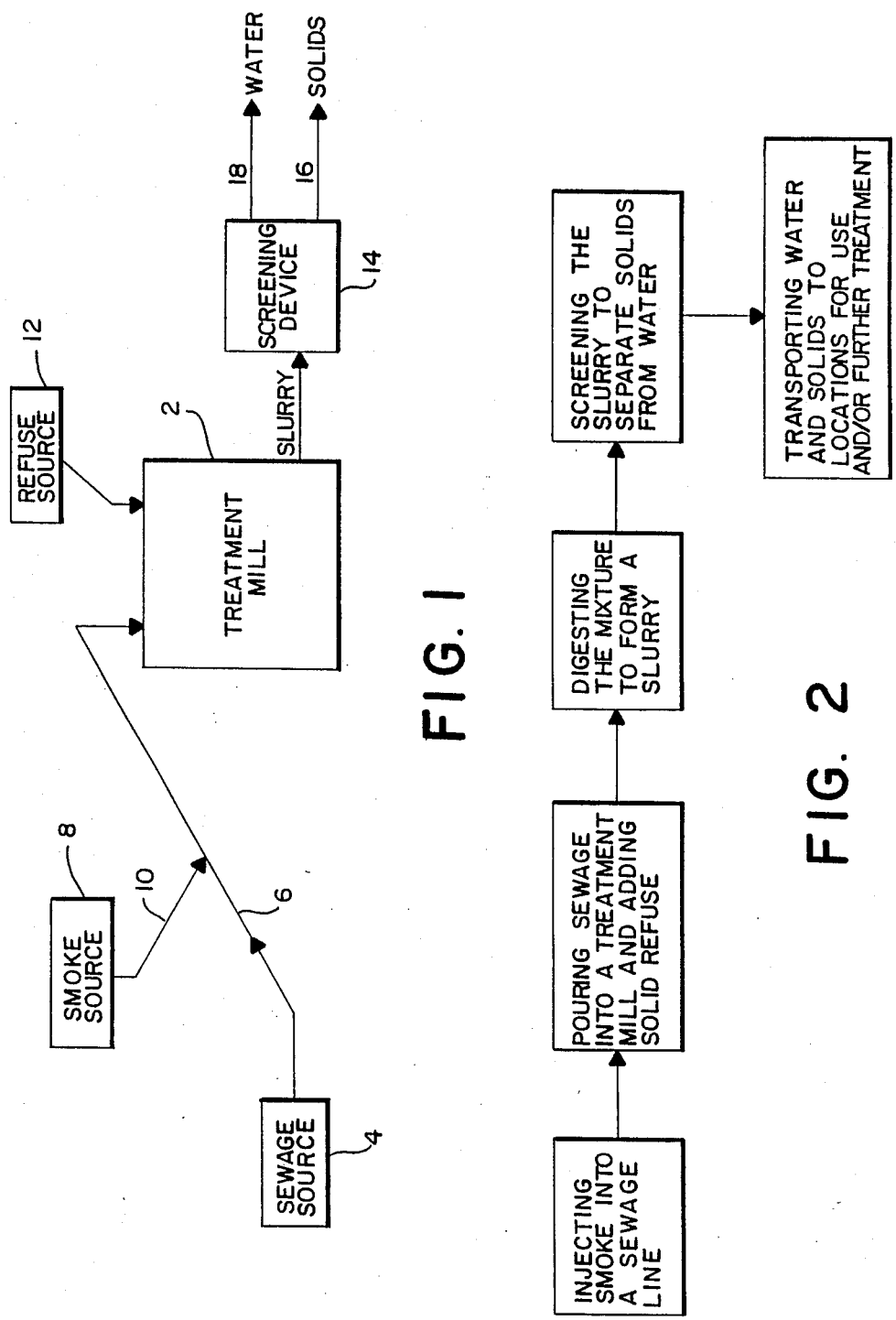

PROCESS FOR TREATING VARIOUS REFUSE MATERIALS, PARTICULARLY SMOKE, GARBAGE AND SEWAGE

FIELD AND HISTORICAL BACKGROUND OF THE INVENTION

The present invention is directed to a process for treating various refuse/waste materials, and more particularly, for treating smoke, solid garbage material from domestic industrial and commercial sources and aqueous sewage.

An ever-increasing problem of the modern society has been the disposal of various domestic, commercial and agricultural waste/refuse materials. As the nations advance in technology and become more and more industrialized, the problem of the waste disposal burgeons. In addition to the smoke emanating from various mills, factories and the like, and the human waste in the form of sewage, the refuse material generally includes solid waste, such as garbage, rubbish, animal waste, grass clippings, weeds, cotton and corn stalks, waste from animal slaughter houses, paper, wood, plastic, etc. One way of disposing the refuse material has been to dispose it of by land-filling. However, this method has led to contamination of soil and has not been found to be very effective. The disposal method most commonly employed is burning of the refuse in suitable incinerating mechanisms and burial thereof in land-fill operations. This method, however, adds to contamination and pollution of the air, and is thus not preferable.

In recent years, several factors have caused an evaluation of the above-described collection and disposal techniques to be made. In the first place, changes in lifestyle, increasing population, and the like cause increase in the amounts of solid refuse which must be collected and disposed of. It has been estimated that more than 220 billion tons of solid refuse is collected annually in the United States at a cost that has become a tremendous financial burden which the responsible local municipalities are finding increasingly difficult to bear. Other factors, as noted above, of general concern are the well known pollution, health and odor problems associated with the burning and burying techniques.

The undesirable results and high costs of the abovedescribed inefficient and antiquated methods of collection and disposal of refuse, along with the wasting of reclaimable materials and the lost of potential source of energy, have spurred a search for new methods of handling such refuse. Many systems and mechanisms have been proposed and built for more efficient handling and disposal of refuse material, with some of those systems designed for the purpose of reclaiming materials, others for the production of methane gas, and still others simply for the purpose of shredding the refuse for more compaction thereof.

In any event, the relatively new systems almost without exception employ some of a mill or grinding mechanism for improving the handling characteristics of the refuse. In general, the mills, and/or grinding devices being employed in these newly developed and proposed systems are mechanisms which were originally designed for other purposes such as pulverizing ores. In many instances, these prior art milling or grinding devices have been employed in the new refuse handling systems in the exact originally developed form and have not been entirely satisfactory due to the fact that they were designed to handle a completely different type of material or materials. In other instances, these prior art milling or grinding devices have been modified somewhat from their original form in an attempt to adapt those devices to the various problems of handling refuse materials, and those modified prior art mechanisms have also not proven entirely satisfactory.

As noted above, the prior art is replete with many methods and apparatus for disposing of solid and aqueous types of refuse/waste material. Some examples of these methods and apparatus are disclosed in the U.S. Pat. Nos. 3,160,354; 3,212,233; 3,985,086; 3,987,970; 4,144,167; 4,151,794; 4,157,961; 4,253,940; 4,437,866; 4,493,459; and 4,586,659.

However, there is a need for a process by which solid and aqueous wastes, as well as gaseous waste, such as smoke, can be processed to convert it to a useful product.

OBJECTS AND SUMMARY OF THE INVENTION

The principal object of the present invention is to provide a process for treating smoke, solid refuse/waste material and sewage to thereby produce a useful final product.

An object of the present invention is to provide a process for handling and treatment of solid, aqueous and gaseous refuse materials.

Another object of the present invention is to provide a process which converts solid, aqueous and gaseous waste materials into a useful final product which can be further processed or treated to produce fertilizers and a liquid material which can be used for irrigational purposes.

Yet another object of the present invention is to provide a process for treating solid, aqueous and gaseous refuse materials which separates the processed materials in a pulverized odor-free blended pumpable slurry and an aqueous solution.

A further object of the present invention is to provide a process which treats the solid, aqueous and gaseous refuse/waste materials simultaneously.

An additional objection of the present invention is to provide a process for treating solid, aqueous and gaseous refuse/waste materials, which separates the solids from the sewage so that the treated water is suitable for uses, such as irrigation, equipment cooling and the like, and the separated solids are suitable for use as fertilizers.

In summary, the object of the present invention is to provide a process for treating smoke, sewage and solid wastes to convert it into useful and odor-free end products. The aqueous solution produced in accordance with the present invention is suitable for non-drinking usages, such as irrigation, and the solids are suitable for use as fertilizers.

BRIEF DESCRIPTION OF THE DRAWING

The above and other objects and advantages and novel features of the present invention will become apparent from the following detailed description of the preferred embodiment of the invention illustrated in the accompanying drawings, in which:

FIG. 1 is a block diagram of the process of the instant invention for treating solid, aqueous and gaseous waste materials; and FIG. 2 is a flow-sheet diagram illustrating the steps involved in the process of the present invention.

DETAILED DESCRIPTION OF THE INVENTION

As generally shown in FIG. 1, the process of the present invention includes a system A which can be located above the ground or under the ground depending upon the circumstances and the availability of space. System A includes a treatment mill 2, the main function of which is to digest and/or treat the solid, aqueous and gaseous refuse materials poured therein. Treatment mill 2 is a conventional device used for shredding and compacting refuse materials. Preferably, treatment mill 2 is of the type disclosed in U.S. Pat. Nos. 3,987,970; 4,144,167; 4,151,794; and 4,493,459. The devices of these patents have been invented by the inventor of the present invention, alone or as a co-inventor. The disclosures of these references are incorporated herein by reference and therefore, a detailed description of these mills is not being provided herein.

A sewage source 4 is connected to treatment mill 2 and carries raw aqueous sewage refuse material into treatment mill 2. Normally, the sewage refuse material is carried under the ground in conduits, and if the system A is located at a sub-ground level, it would only be necessary to connect one of these conduits (not shown) to treatment mill 2.

A smoke source 8 is connected via a conduit 10 to conduit 6 carrying aqueous sewage waste. Smoke source 8 can be any one of many conventional sources which produce smoke as a waste end product. Preferably, the smoke is injected at a rate of about 50 tons per hour into sewage line conduit 6 carrying the sewage at a rate of about 50 tons per hour. The sewage refuse material carrying the smoke is poured in treatment mill 2 and solid refuse material is poured therein from a refuse source 12. Once a sufficient amount of solid, aqueous and gaseous refuse material is accumulated in treatment mill 2, it is then operated to digest the refuse material for a period of time sufficient to form a pumpable slurry which is then carried to a screening device 14. The screening device 14 may be of any one of several brands and types of such well known devices which will separate the aqueous solution from the solids in the treated refuse material. The refuse material is processed within screening device 14 in the well known manner and separated solids emerge from solid outlet port 16 and the aqueous solution emerges from outlet port 18.

The water or the aqueous solution exiting through liquid outlet port 18 may then be carried to fields, such as golf courses, for irrigational purposes, and the solids exiting through outlet 16 may be taken to places where it may be treated to be used as a fertilizer or animal food, etc.

Although not shown, air and/or oxygen may be supplied to treatment mill 2 which speeds up the aerobic bacterial growth so that the slurry emerging from the mill will be odor-free due to the fact that biochemical oxygen demand has been satisfied.

It is believed that the heat of the smoke (approximately 1900° to 2500° C.) and the cellulose present in the solid waste material purifies both the water and the waste material and salvages for their further use.

As can be observed from the above, the three different types of refuse materials, i.e, solids, liquids and gas, have been efficiently treated by using the claimed method. In addition, the process of the present invention produces as end products the solids which may be used as fertilizers and the aqueous solution which may be used for irrigational purposes. The present process is simple, easy and requires minimum effort on the part of an operator and can be made automatic.

While this invention has been described as having a preferred method, it will be understood that it is capable of further modifications. This application is therefore intended to cover any variations, uses, and/or adaptions of the invention following the general principles thereof, and including such departures from the present disclosure as have come within known or customary practice in the art to which this invention pertains, and as may be applied to the essential features hereinbefore set forth and fall within the scope of this invention or the limits of the claims appended hereto.

What is claimed is:

1. A process for treating solid, liquid and gaseous refuse materials, comprising the steps of:
   (a) injecting a gaseous refuse material including smoke into a conduit carrying a generally liquid refuse material including raw sewage thereby forming a first mixture;
   (b) pouring said first mixture into a treatment mill and adding a generally solid refuse material including cellulose thereto for forming a second mixture;
   (c) aerobically digesting said second mixture by operating said treatment mill for a period of time sufficient to form a pumpable slurry; and
   (d) processing said slurry to separate the solids from the aqueous solution.

2. The process of claim 1, wherein:
   (a) said solid refuse material including domestic, agricultural, or industrial waste, or a combination thereof.

3. The process of claim 2, wherein:
   (a) said smoke is injected at a rate of about 50 tons per hour into said line carrying said raw sewage; and
   (b) said raw sewage flowing at a rate of about 50 tons per hour.

4. A process for treating smoke, aqueous sewage and solid waste material, comprising the steps of:
   (a) injecting a gaseous refuse material including smoke into an aqueous sewage conduit carrying raw aqueous sewage at a rate of about 50 tons/hour;
   (b) pouring the raw aqueous sewage containing smoke into a treatment mill and adding solid waste material including cellulose;
   (c) aerobically digesting solid waste material with the raw aqueous sewage containing smoke for a period of time sufficient to form a pumpable slurry; and
   (d) screening the slurry to separate the solids from liquid.

* * * * *